3,577,390
ORGANOSILICON-AMINO COMPOUNDS AS CATALYSTS IN POLYURETHANE PRODUCTION
William J. Owen, Penarth, Glamorgan, and Norman C. Lloyd, Cardiff, Glamorgan, Wales, assignors to Midland Silicones Limited, Reading, Berkshire, England
No Drawing. Filed Sept. 18, 1968, Ser. No. 760,710
Claims priority, application Great Britain, Sept. 27, 1967, 44,033/67
Int. Cl. C08g 22/36, 22/38, 22/44
U.S. Cl. 260—77.5                5 Claims

ABSTRACT OF THE DISCLOSURE

Organosilicon amino compounds are employed as curing catalysts in the production of polyurethanes. The novel catalysts are defined by the formula $$R_a R'_b N[QSiR''_3]_{3-a-b}$$

where R is hydrogen or certain organic radicals, R' and R'' are certain organic radicals, Q is methylene, ethylene or propylene and $a$ and $b$ are 0 or 1.

---

This invention relates to a process for preparing polyurethane foams and is particularly concerned with the use of certain organosilicon compounds as novel polyurethane production catalysts.

The utility of organic tertiary amino compounds as effective catalysts in polyurethane foam production is already well established and catalysts of this type which have been chiefly employed include N-ethyl morpholine, triethylene diamine and triethylamine.

We have now discovered that certain organosilicon amino compounds are also effective catalysts in the preparation of cellular and non-cellular polyurethanes. We have further found that at least a proportion of the organosilicon amino compounds exhibit improved catalytic efficiency in the foam producing reaction such that less of the catalyst may be required and the settleback of the foam during the foaming process may be reduced.

According to this invention there is provided a process for the production of a polyurethane which comprises reacting an organic polyhydroxy compound with an organic polyisocyanate in the presence of a reaction catalyst comprising an organosilicon compound of the general formula $R_a R'_b N[QSiR''_3]_{3-a-b}$, in which each R represents a hydrogen atom or a monovalent saturated aliphatic hydrocarbon radical and R' and R'' each represents a monovalent saturated aliphatic hydrocarbon radical, Q represents an alkylene radical containing from 1 to 3 carbon atoms, $a$ and $b$ each have a value of 0 or 1 and the sum of $a+b$ is 0, 1 or 2.

The organosilicon amino compounds which comprise the novel catalysts according to this invention constitute in general a known class of materials and can be prepared by methods known in the art. For example, one convenient method of preparation comprises reacting an organosilicon compound of the general formula MSiR''$_3$, wherein M is a chloroalkyl radical, with ammonia or an organic amino, for example, ethylamine, diethylamine, or butylamine.

In the general formula representing the operative organosilicon compounds R, R' and R'' each represent a monovalent saturated aliphatic hydrocarbon radical, for example, an alkyl radical, such as, the methyl, ethyl, propyl, nonyl or octadecyl radicals or a cycloalkyl radical such as cyclohexyl. In addition, R can also represent hydrogen atom.

Illustrative of the organosilicon amino compounds which are employed as catalysts in the process of this invention therefore are (trimethylsilylmethyl)-diethylamine, bis(trimethylsilylmethyl)-butylamine, bis(dimethyloctadecylsilylmethyl)-ethylamine, bis(triphenylsilylmethyl)-ethylamine, (tributylsilylmethyl)-ethylamine, bis(trimethylsilylpropyl)-amine, bis(octyldimethylsilylmethyl)-amine and tris(trimethylsilylmethyl)-amine.

The organosilicon amino compounds can be employed in the preparation of polyurethane materials according to this invention in the range of proportions which is conventional for the previously known amine catalysts, such as, N-methylmorpholine and triethylenediamine, that is, for example, from 0.1 to about 5 percent by weight based on the total weight of the organic polyhydroxy compound and organic polyisocyanate employed in the polyurethane foam formulation. However, at least some of the organosilicon amino compounds have been found to exhibit a catalytic activity which is superior to that of the presently employed organic amines and the use of less than the conventional proportion of the organosilicon amino catalyst will be possible in many formulations.

A wide variety of organic polyhydroxy compounds are known which will react with organic polyisocyanates to produce a polyurethane material and any of these can be employed in the process of this invention. Typical polyhydroxy compounds include hydroxy polyester compounds, such as, the esters of polycarboxylic acids with polyhydroxy compounds, polyethers, polyhydric alcohol derivatives of polyamines and castor oil and hydroxylated products derived therefrom, such as, the condensation products of castor oil with a glycol. Of particular interest and wide commercial application in the preparation of cellular polyurethanes are the linear and branched polyethers having molecular weights of from about 1000 to about 3500. Such polyethers include the polyoxyalkylene glycols, for example, polypropylene glycols, polyoxyethylene glycols, mixed polyethylenepolypropylene glycols and the polyoxyalkylene derivatives of polyhydroxy compounds such as the polyoxyethylene and polyoxypropylene ethers of glycerol, trimethylolpropane, triethanolimine, 1,2,6-hexanetriol, sorbitol, sucrose and pentaerythritol.

Organic polyisocyanates for polyurethane preparation are now well known and widely avilable materials and include such compounds as phenylene di-isocyanates, hexamethylene di-isocyanate, diphenylmethane - 4,4' - di-isocyanate and 1,5-naphthalene di-isocyanate. Tolylene-2,4-di-isocyanate is, however, the most commonly employed polyisocyanate in the preparation of polyurethane foams.

The organosilicon amino compounds can be employed as catalysts in the preparation of polyurethane products of both the cellular and non-cellular type. Any of the known techniques for the production of such materials are applicable. For example, blowing agents such as water or chlorofluorohydrocarbons and/or stabilizers such as siloxaneoxyalkylene copolymers can be introduced into the reaction mixture in the manner known for the preparation of cellular polyurethanes. Also, in common with known techniques, the organosilicon amino compounds of this invention can comprise the sole catalyst material or they can be employed in combination with metal organic compounds, for example, tin compounds such as stannous octoate, stannous oleate, dibutyltin dilaurate, dibutyltin diacetate and dioctyltin oxide. Particularly preferred catalysts for the production of cellular polyurethanes are stannous octoate and dibutyltin dilaurate.

The following examples, in which the parts are expressed as parts by weight, illustrate the invention.

EXAMPLE 1

To 100 parts of a commercially available polypropylene glycol were added with stirring 1.1 parts of commercial siloxaneoxyalkylene copolymer foam control agent, 4.1 parts of water, 0.1 part of $$C_2H_5N[CH_2Si(CH_3)_3]_2$$

and 0.15 part of stannous octoate, the latter being added as a dispersion in 8.8 parts of the polyether. This mixture was stirred for 20 seconds and a mixture of 110 parts of tolylene di-isocyanate and 4.2 parts of trichloromonofluoroethane added, the stirring being continued for a further 10 seconds. The mixture foamed and was allowed to cure at room temperature. The product was a flexible polyurethane foam of good breathability characteristics.

During the foaming process the settleback of the foam was measured and found to be 3.5%, compared with 17.4% obtained in a controlled comparative experiment employing triethylene diamine in place of the aminosilicon catalyst.

EXAMPLE 2

Example 1 was repeated employing 0.1 part of the following organosilicon compounds in place of the $C_2H_5N[CH_2Si(CH_3)_3]_2$ used in that example $$[C_8H_{17}(CH_3)_2SiCH_2]_2NH$$

$[(CH_3)_3SiCH_2]NH$ and $C_2H_5NH[CH_2Si(CH_3)_3]$.

In each case the formulation foamed satisfactorily with a low percentage settleback to give a flexible polyurethane foam.

That which is claimed is:

1. In a method for producing polyurethanes by reacting an organic polyhydroxy compound with an organic polyisocyanate in the presence of a metal organic compound as catalyst, the improvement consisting of employing as a co-catalyst an organosilicon compound of the general formula $R_aR'_bN(QSiR''_3)_{3-a-b}$ wherein each R is a hydrogen atom or a monovalent saturated aliphatic hydrocarbon radical, each R' and R'' represents a monovalent saturated aliphatic hydrocarbon radical, Q represents an alkylene radical of 1, 2 or 3 carbon atoms, $a$ and $b$ each have a value of 0 or 1 and the sum of $a+b$ is 0 or 1.

2. A method as claimed in claim 1 wherein Q is the methylene radical.

3. A method as claimed in claim 1 wherein the sum of $a+b$ is 1.

4. A method as claimed in claim 1 wherein the organosilicon compound is employed in a quantity of from 0.1 to 5 percent by weight based on the total weight of the organic polyhydroxy compound and the organic polyisocyanate.

5. A method as claimed in claim 1 wherein the organic polyhydroxy compound is a polyether.

References Cited

FOREIGN PATENTS 1,239,468   4/1967   Germany _____ 260—2.5

DONALD E. CZAJA, Primary Examiner

M. J. WELSH, Assistant Examiner

U.S. Cl. X.R.

260—2.5, 18, 75